United States Patent [19]

Greenwalt

[11] Patent Number: 5,380,352
[45] Date of Patent: * Jan. 10, 1995

[54] METHOD OF USING RUBBER TIRES IN AN IRON MAKING PROCESS

[75] Inventor: Richard B. Greenwalt, Danville, Calif.

[73] Assignee: Bechtel Group, Inc., San Francisco, Calif.

[ * ] Notice: The portion of the term of this patent subsequent to Nov. 9, 2010 has been disclaimed.

[21] Appl. No.: 63,630

[22] Filed: May 18, 1993

Related U.S. Application Data

[63] Continuation-in-part of Ser. No. 958,043, Oct. 6, 1992, Pat. No. 5,259,864, and a continuation-in-part of Ser. No. 991,914, Dec. 17, 1992, and a continuation-in-part of Ser. No. 56,341, Apr. 30, 1993, Pat. No. 5,259,865.

[51] Int. Cl.⁶ .................................................. C21B 13/14
[52] U.S. Cl. ............................................. 75/445; 75/958
[58] Field of Search .................................... 75/445, 958

[56] References Cited

U.S. PATENT DOCUMENTS

| | | | |
|---|---|---|---|
| 3,850,615 | 11/1974 | Reeves | 75/26 |
| 3,936,296 | 2/1976 | Campbell . | |
| 4,070,181 | 1/1978 | Widell | 75/91 |
| 4,073,642 | 2/1978 | Collin et al. | 75/35 |
| 4,175,949 | 11/1979 | Breznay | 75/471 |
| 4,317,677 | 3/1982 | Weber et al. | 75/43 |
| 4,389,043 | 6/1983 | Weber et al. | 266/218 |
| 4,396,421 | 8/1983 | Stift et al. | 75/11 |
| 4,409,023 | 10/1983 | Weber et al. | 75/38 |
| 4,448,402 | 5/1984 | Weber et al. | 266/183 |
| 4,588,437 | 5/1986 | Kepplinger et al. | 75/43 |
| 4,605,205 | 8/1986 | Langner et al. | 266/160 |
| 4,725,308 | 2/1988 | Kepplinger | 75/26 |
| 4,806,158 | 2/1989 | Hirsch et al. | 75/26 |
| 4,822,411 | 4/1989 | Standler et al. | 75/35 |
| 4,849,015 | 7/1989 | Fassbinder et al. | 75/26 |
| 4,874,427 | 10/1989 | Hamada et al. | 75/26 |
| 4,889,323 | 12/1989 | Pusch et al. | 266/142 |
| 4,889,556 | 12/1989 | Dighe | 75/958 |
| 4,895,593 | 1/1990 | Sulzbacher et al. | 75/26 |
| 4,897,179 | 1/1990 | Mori et al. | 208/127 |
| 4,913,733 | 4/1990 | Hauk | 75/491 |
| 4,946,498 | 8/1990 | Weber | 75/26 |
| 4,957,545 | 9/1990 | Hikosaka et al. | 75/501 |
| 5,178,076 | 1/1993 | Hand et al. . | |
| 5,259,864 | 11/1993 | Greenwalt | 75/445 |

FOREIGN PATENT DOCUMENTS

0468950A2  1/1991  European Pat. Off. .

OTHER PUBLICATIONS

Fleichtner Hanns et al. "The Corex Process" *Skillings Mining Review* Jan. 14, 1989 pp. 20-27.
Developments to Watch, *Business Week*, Sep. 28, 1992.
Fleichtner, Hanns et al. "The Corex Process" *Skillings' Mining Review*, Jan. 14, 1989, pp. 20-27.

*Primary Examiner*—Melvyn J. Andrews
*Attorney, Agent, or Firm*—Townsend and Townsend Khourie and Crew

[57] ABSTRACT

The invention provides a method for both disposing of an environmentally undesirable material comprising rubber tires and the sulfur and metals contained therein and of providing fuel for a process of making molten iron or steel preproducts and reduction gas in a melter gasifier. The metals freed from combustion of the rubber tires is contained in the molten iron and sulfur freed from combustion of the rubber tires is contained in the slag.

2 Claims, 2 Drawing Sheets

METHOD OF USING RUBBER TIRES IN AN IRON MAKING PROCESS

BACKGROUND OF THE INVENTION

This application is a continuation in part of U.S. application Ser. No. 07/958,043 to Andrews, filed Oct. 6, 1992, now U.S. Pat. No. 5,259,864; Ser. No. 07/991,914 to Andrews, filed Dec. 17, 1992 and Ser. No. 08/056,341 to Andrews, filed Apr. 30, 1993, now U.S. Pat. No. 5,259,865.

The present invention relates to a method of using rubber tires as the fuel for a process of making molten iron or steel preproducts and reduction gas in a melter gasifier.

Used rubber tires, which are the main source of waste rubber, are an environmental problem. It has been estimated that over twenty million used tires are discarded annually in California alone. Illinois produces over 10 million used tires each year. A typical automobile rubber tire normally weighs 18 pounds. Used tires requiring disposal in the United States alone are several times those figures. It has been estimated several methods of disposing of used tires have been suggested and accomplished. Tires have been suggested for use as fuel in power plants. They have also been suggested as fuel for cement kilns. It has been reported that TVA burned about 175 tons of tire-derived fuel during a test. The used tires were mixed with crushed coal used to fire a boiler. Tire rubber has a heating value of 12,000 to 16,000 BTU's per pound. This compares to coal which has a heating value of 11,000 to 13,000 BTU's per pound.

A report discussing U.S. Pat. No. 5,178,076 indicated that a "biomass burner," which efficiently ignites anything from newspaper to old tires and can be used as an alternative fuel source for conventional oil and gas boilers. The burner, which is said to operate at temperatures of 1,800° to 2,800° F., has several virtues. First, it requires only a tiny amount of external energy because it relies on the heat produced by garbage once the process gets under way. Second, the process produces a clean, torchlike flame and separates the few components that will not burn without creating a molten mess. The process begins by heating solid wastes, like old tires, in an oxygen-starved chamber until most components are turned into gas. Because the chamber contains little oxygen, the components do not actually burn. In the case of tires, the rubber quickly turns to gas, at about 800° F., while components like metal, dirt and nylon simply drop to the bottom of the chamber.

In recent years methods utilizing a melter gasifier have been developed to produce molten iron or steel preproducts and reduction gas. Most of these processes utilize a coal fluidized-bed. The use of petroleum coke has also been suggested. A high temperature is produced in the melter gasifier utilizing coal and blown in oxygen to produce a fluidized bed and iron sponge particles are added from above to react in the bed to produce the molten iron.

Thus in European Patent B1-0010627, a coal fluidized-bed with a high-temperature zone in the lower region is produced in a melter gasifier, to which iron sponge particles are added from above. On account of the impact pressure and buoyancy forces in the coal fluidized-bed, iron sponge particles having sizes greater than 3 mm are considerably braked and substantially elevated in temperature by the heat exchange with the fluidized bed. They impinge on the slag layer forming immediately below the high-temperature zone at a reduced speed and are melted on or in the same. The maximum melting performance of the melter gasifier, and thus the amount and temperature of the molten iron produced, not only depends on the geometric dimensions of the melter gasifier, but also are determined to a large extent by the quality of the coal used and by the portion of larger particles in the iron sponge added. When using low-grade coal, the heat supply to the slag bath, and thus the melting performance for the iron sponge particles, decline accordingly. In particular, with a large portion of iron sponge particles having grain sizes of about 3 mm, which cannot be heated to the same extent as smaller particles by the coal fluidized-bed when braked in their fall and which, therefore, necessitate a higher melting performance in the region of the slag layer, the reduced melting performance has adverse effects in case low-grade coal is used.

A melter gasifier is an advantageous method for producing molten iron or steel preproducts and reduction gas are described in U.S. Pat. No. 4,588,437. Thus there is disclosed a method and a melter gasifier for producing molten iron or steel preproducts and reduction gas. A first fluidized-bed zone is formed by coke particles, with a heavy motion of the particles, above a first blow-in plane by the addition of coal and by blowing in oxygen-containing gas. Iron sponge particles and/or pre-reduced iron ore particles with a substantial portion of particle sizes of more than 3 mm are added to the first fluidized-bed zone from above. A melter gasifier for carrying out the method is formed by a refractorily lined vessel having openings for the addition of coal and ferrous material, openings for the emergence of the reduction gases produced, and openings for tapping the metal melt and the slag. Pipes or nozzles for injection of gases including oxygen enter into the melter gasifier above the slag level at at least two different heights.

Another process utilizing a melter gasifier is described in U.S. Pat. No. 4,725,308. Thus there is disclosed a process for the production of molten iron or of steel preproducts from particulate ferrous material as well as for the production of reduction gas in the melter gasifier. A fluidized-bed zone is formed by coke particles upon the addition of coal and by blowing in oxygen-containing gas by nozzle pipes penetrating the wall of the melter gasifier. The ferrous material to be reduced is introduced into the fluidized bed. In order to be able to produce molten iron and liquid steel preproducts in a direct reduction process with a lower sulfur content from the coal used, the ferrous material to be reduced is supplied closely above the blow-in gas nozzle plane producing the fluidized bed. An arrangement for carrying out the process includes a melter gasifier in which charging pipes penetrating its wall are provided in the region of the fluidized-bed zone closely above the plane formed by the nozzle pipes. The ferrous material to be melted as well as the dusts separated from the reduction gas and, if desired, fluxes containing calcium oxide, magnesium oxide, calcium carbonate and/or magnesium carbonate are introduced therethrough.

There is also a process known as the COREX® process (COREX® is a trademark of Deutsche Voest-Alpine Industrieanlagenbau GMBH and Voest-Alpine Industrieanlagenbau). The COREX® process is described in *Skillings' Mining Review* Jan. 14, 1989 on pages 20-27. In the COREX® process the metallurgical work is carried out in two process reactors: the reduction furnace and the melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100°–1,150° C. Oxygen blown into the melter gasifier produces a coke bed from the introduced coal and results in a reduction gas consisting of 95% $CO+H_2$ and approximately 2% $CO_2$. This gas exits the melter gasifier and is dedusted and cooled to the desired reduction temperature between 800° and 850° C. The gas is then used to reduce lump ores, pellets or sinter in the reduction furnace to sponge iron having an average degree of metalization above 90%. The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, $SiO_2$ may also be charged into the system to adjust the chemical composition and viscosity of the slag. Tapping procedure and temperature as well as the hot metal composition are otherwise exactly the same as in a blast furnace. The top gas of the reduction furnace has a net calorific value of about 7,000 $KJ/Nm^3$ and can be used for a wide variety of purposes.

The fuels used in these processes are typically described as a wide variety of coals and are not limited to a small range of coking coal. Brown coal and steam coal which are relatively poor quality coal having a relatively high ash content i.e. plus 15%, have been identified as suitable for use in these processes. Coke made from coal has also been identified as a fuel for many of the processes utilizing melter gasifiers. The *Skillings' Mining Review* article states that petroleum coke suits the requirements of the COREX® process.

The present invention is directed to a solution for the disposal of an environmentally objectionable material and provision of a new and unexpectedly superior fuel source for processes utilizing melter gasifiers to make molten iron or steel preproducts.

SUMMARY OF THE INVENTION

In accordance with the invention used rubber tires make an excellent source of carbon in processes making molten iron or steel preproducts in which a melter gasifier unit is used. Moreover, the reaction in these processes utilizing the rubber tires as a fuel in the melter gasifier tend to combust the rubber tires substantially completely with reduction gas as the only gaseous product. Most residual sulfur from the tires is carried as a sulfide over with the slag formed in the melter gasifier and can be removed and disposed of with the slag. Steel bead tire reinforcing is melted and carried over in stable form in solution in the molten iron or steel preproducts and will solidify therewith.

In a broad aspect, the invention provides a method for both disposing of an environmentally undesirable material which is difficult and expensive to dispose of namely used rubber tires and the sulfur and metals contained therein and of providing fuel for a process of making molten iron or steel preproducts and reduction gas in a melter gasifier. A melter gasifier is used in the invention and has an upper fuel charging end and a reduction gas discharging end and a lower molten metal and a slag collection end. Entry means are provided into the melter gasifier for charging ferrous material usually in particulate form into the melter gasifier. Rubber tires usually in particulate form are introduced into the melter gasifier at the upper fuel charging end. Oxygen-containing gas is blown into the rubber tires in the melter gasifier to form at least a first fluidized bed of particles formed by combustion of rubber tires. Particulate ferrous material is introduced into the melter gasifier through the entry means. Rubber tires, oxygen and particulate ferrous material are reacted to combust the major portion of the rubber tires. Reduction gas and molten iron or steel preproducts are produced and a slag is formed which will contain sulfur freed by combustion of the rubber tires. Metals from the tires are carried over in stable form and go into solution in the molten iron or steel preproducts. The slag and the sulfur contained therein are removed from the melter gasifier for disposal.

OBJECT OF THE INVENTION

It is a particular object of the present invention to provide a process for both disposing of an environmentally undesirable material and providing a novel fuel for an iron making process which utilizes a melter gasifier. Other objects and advantages of the present invention will be apparent from the following detailed description read in view of the accompanying drawings which are made a part of this specification.

DESCRIPTION OF THE PREFERRED EMBODIMENT

The invention is predicated on the recognition that rubber tires can advantageously replace coal or coke made from coal which heretofore was used as a source of carbon in iron making processes wherein a melter gasifier is used. In most such applications the rubber tires will be a superior fuel as opposed to coal for reasons more fully set out herein. In addition, the use of rubber tires in the iron making process in a melter gasifier substantially completely combusts the rubber tires and the material contained therein thus solving an environmentally sensitive disposal problem. Sulfur and metals which are contained in rubber tires are also safely disposed of in accordance with the invention. While rubber tires have been burned in heater and boiler applications, they, so far as is known, have never been used in iron making processes in which a melter gasifier is used.

Figure 1:
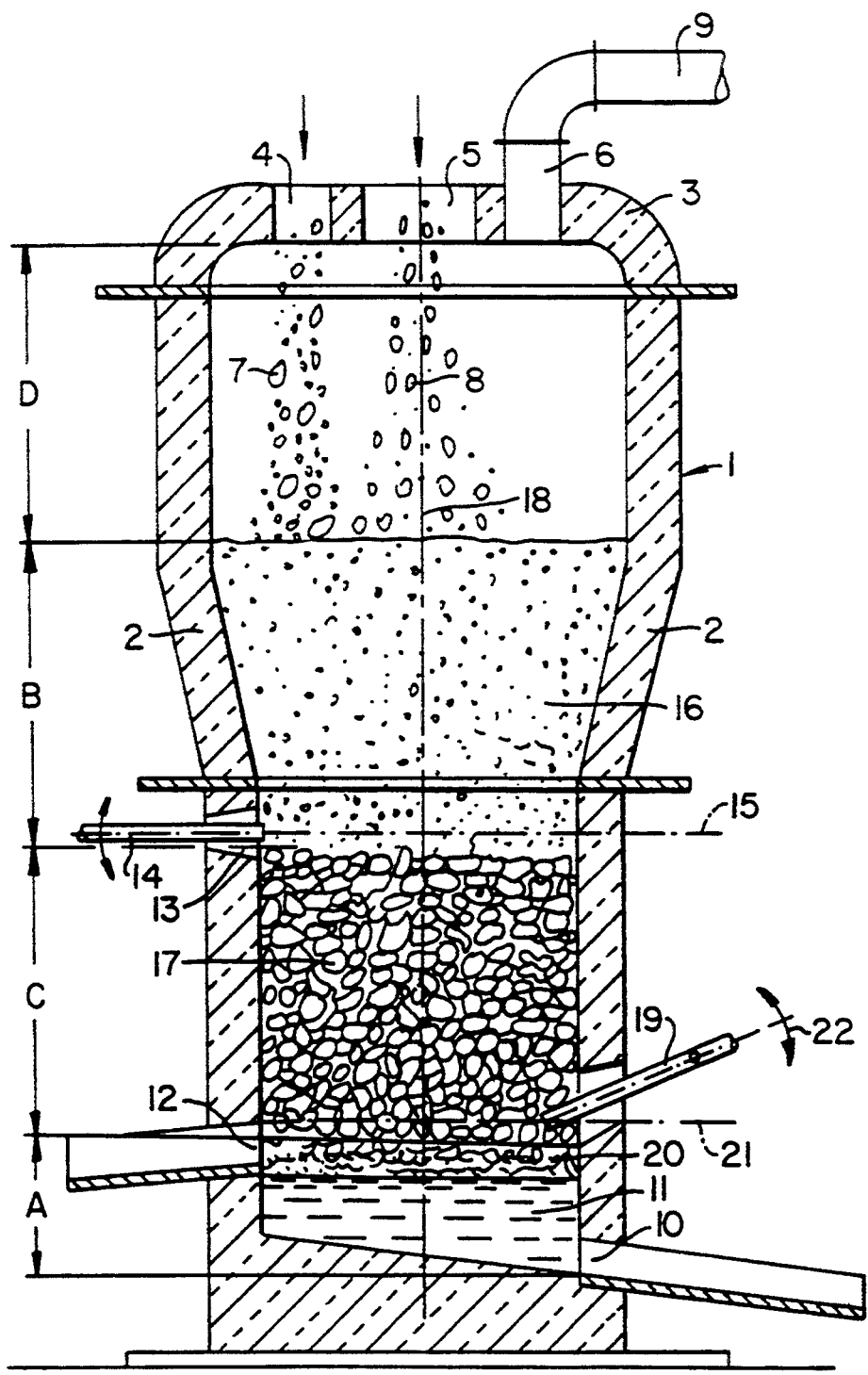
FIG. 1 is a schematic vertical section of a melter gasifier useful in accordance with the present invention.

Thus, in accordance with the invention, coal is replaced with or supplemented by rubber tires in iron making processes which utilize a melter gasifier. FIG. 1 schematically illustrates a melter gasifier useful with the present invention. The melter gasifier, generally indicated by the numeral 1 has side walls 2 which are refractory lined on their inner sides. The hood 3 of the melter gasifier 1 has three openings 4, 5 and 6. In accordance with the opening 4 is adopted for charging particle rubber tires 7 of various grain or piece sizes into the interior of the melter gasifier. Particulate ferrous material 8 is charged into the melter gasifier through the opening 5, preferably iron sponge. It is suitable to supply the iron sponge at an elevated temperature. To carry away the reduction gas which is formed during the reaction in the melter gasifier, a conduit 9 is provided extending out of opening 6. The reduction gas carried away may be is used in many processes to pre-reduce or reduce oxidic iron ore.

In general the melter gasifier comprises a lower section A, a central section B, an intermediate section C between sections A and B and an upper section D above the central section B, whose cross section is widened and which serves as an expansion zone. In the bottom region of the lower section A of the melter gasifier 1, which serves to collect molten metal and liquid slag including any sulfur residue from the combustion of rubber tires, a tapping opening 10 for the melt 11 is provided in the wall 2. Further up the wall, there is an opening 12 for the slag tap in the lower section A. Alternatively, the slag may be tapped with the metal and separated outside the melter gasifier. In the lower region of the central section B of the melter gasifier 1, a nozzle pipe 14 is inserted through an opening 13 in the wall 2. Oxygen-containing carrier gas is injected into the melter gasifier through nozzle pipe 14. If desired, carbon carriers can be introduced into the melter gasifier 1 in a first horizontal blow-in plain 15.

Preferably, a plurality of openings 13 with nozzle pipes 14 are present at this location spaced around the melter gasifier. In the central section B, a first fluidized bed zone 16 may be formed by the finer particles for example those of less than one-half inch in size from combusted rubber tires. The intermediate section C, which, in the embodiment illustrated, is cylindrically designed, is provided to accommodate a second zone 17 of a fluidized bed formed by the coarser particles for example from one-half inch to two inches in size from combustion of the rubber tires. Generally, the particles in the fluidized bed in this section of the melter gasifier will have less motion than those in section B. Through the wall of the intermediate section C, gas supply means, in the present case nozzle pipes or tuyeres 19, are inserted. The tuyeres are positioned to direct the gases toward the central axis 18 of the melter gasifier. The tuyeres are adapted for injecting oxygen-containing gas and carbon carriers into the melter gasifier. They project into the second zone 17 of coked rubber tire particles, ending closely above the slag layer 20. Just one nozzle pipe 19 has been illustrated in FIG. 1 depending on the size of the melter gasifier, 10 to 40 preferably 20 to 30, nozzle pipes 19 may be provided, and located substantially in a second horizontal blow-in plane 21. The nozzle pipes 19 are arranged so as to be vertically pivotable in the direction of the double arrow 22. Also the nozzle pipes 14, through which the carrier gas and additional fuel flow into the first fluidized-bed zone 16 are designed to be vertically pivotable with the embodiment of the invention illustrated.

The ferrous material 8 introduced through the opening 5 at first reaches the first fluidized-bed zone 16 after having fallen through the upper section D of the melter gasifier which serve as an expansion zone, in which the ferrous material is slowed and heated. Smaller particles melt, drop through the second zone 17 of particles and descend into the lower section A. Larger particles at first remain lying on the second zone 17 or are held fast in the uppermost layer of this zone, until they are also melted upon the action of the high temperature prevailing in the region of the first blow-in plane 15. In the second zone, the downwardly dropping metal melt is super-heated and, if desired, may be treated by the reaction of fine particle fluxes, which are introduced through the nozzle pipes 19. The metal melt 11 tapped through the opening in 10 is sufficiently hot in order to be subjected to further metallurgical aftertreatments. Above the melt 11, a layer of liquid slag 20 collects. The liquid slag may be stripped off via the tap opening 12. The rubber tire particles, during operation of the melter gasifier, must be continuously supplemented through the opening 4 with larger pieces, which are preferably used to build up the second zone 7, after falling through the first zone 16. The melter gasifier shown in FIG. 1 and the prior art operation using coal or coke produced from coal are described in U.S. Pat. No. 4,588,437.

Figure 2:
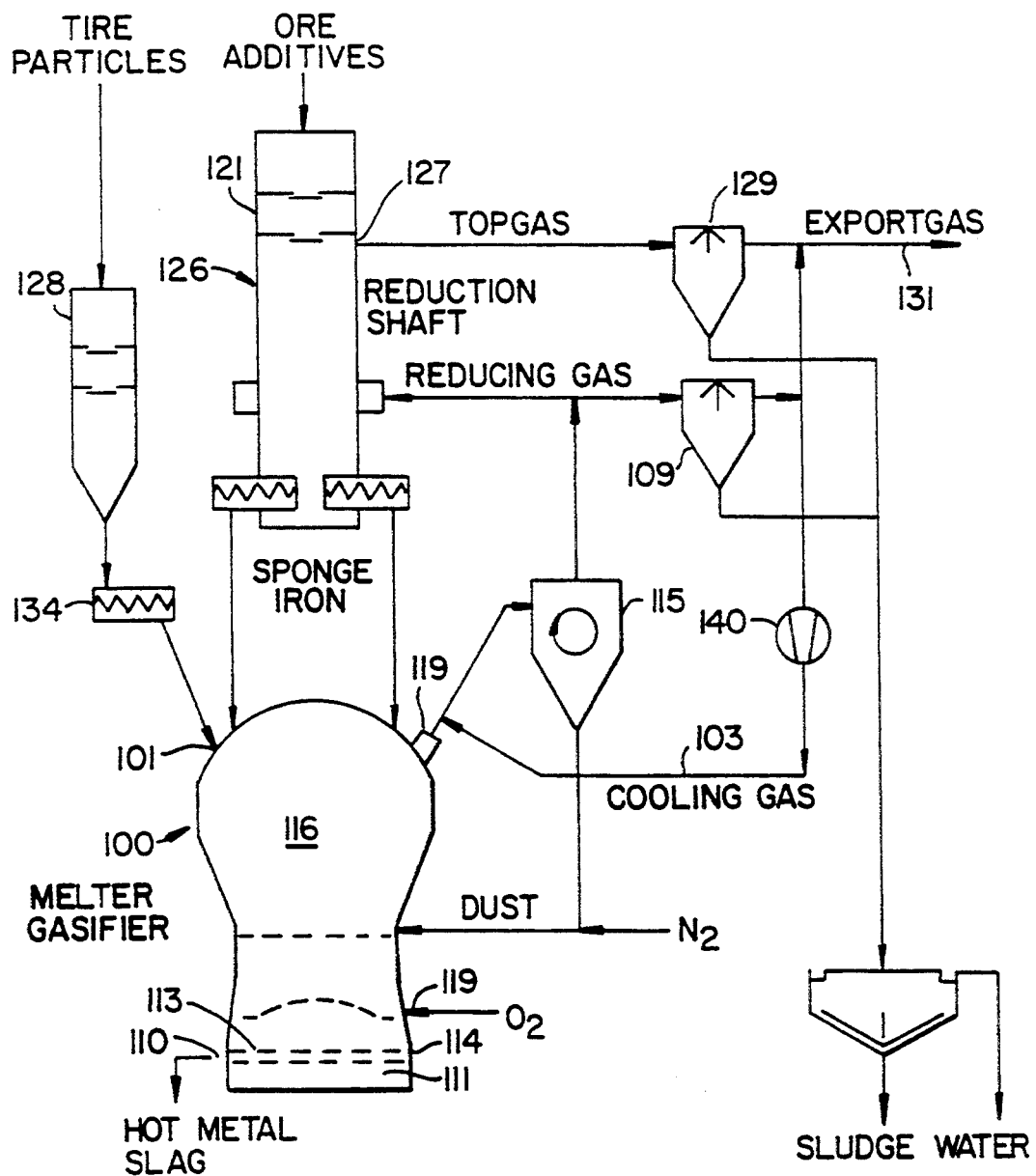
FIG. 2 is a schematic flow sheet illustrating the COREX® process in which the method of the present invention is particularly useful.

Refer now to FIG. 2 which is a schematic flow sheet of the COREX ® process in which the method of the invention is particularly useful. The COREX ® process utilizes a melter gasifier substantially similar to the melter gasifier of FIG. 1 and generally indicated in FIG. 2 by the numeral 100. The COREX ® process is designed to operate under elevated gas pressures up to five bar. The process pressure is supplied from the integral oxygen production facility which supplies oxygen through the tuyeres 119 on the COREX ® melter gasifier 100. Gasifier gas pressure from the melter gasifier 100 operates the primary direct reduction furnace 126 for iron ore reduction to sponge iron.

Charging of particulate rubber tires to the melter gasifier 100 is accomplished through a pressurized lock hopper 128. The iron ore is supplied to the reduction furnace 126 through a similar lock hopper 121 in a manner well known to those skilled in the art° The particulate rubber tire material is stored in a pressurized bin and charged into the melter gasifier by suitable means such as speed controlled feed screw 134.

The used rubber tires are particulated or shredded by mechanical means to provide rubber particles preferably having the largest dimension of 2 inches or less. Tires containing steel reinforcing are particularly desirably disposed of since the steel will be melted in the COREX ® process and removed with the molten iron. Various shredding and chopping techniques suitable for bundling rubber tires are known in the art and may be used for particle preparation.

Upon entering the dome of the melter gasifier 100, at entry port 101, the particles of the rubber tires are burned at 1100° C. and cracked in the reducing atmosphere to CO and $H_2$. The coked rubber tire particles are rapidly heated to 1100° C. and descend with the hot reduced sponge iron particles and hot calcined lime particles from the reduction furnace 126 to the dynamic fluidized bed. The coked rubber tires (essentially all carbon) are gasified into CO which rises to the gasifier gas outlet 119.

The sponge is melted in the dynamic particle bed 116 and drops to a molten liquid iron pool 111 accumulated below the oxygen tuyeres 119 on the melter gasifier hearth 114. The silica and alumina oxide content of the sponge iron is fluxed and melted with the calcined lime in the bed to form liquid slag droplets which descend and form a liquid slag layer 113 covering the liquid iron pool 111. The liquid iron and slag are periodically tapped and removed through a taphole 110 from the melter gasifier hearth.

As the coked rubber tire particles burn at a high temperature with oxygen above the tuyeres 119, an oxidizing coolant, such as steam or $CO_2$, or both are injected at the tuyere level to maintain the melter gasifier dome temperature of 1100° C. The injected coolants create additional reducing gas with hydrogen forming from reduction of the steam and CO forming from the reduction of the $CO_2$. The combined reducing gases rise to the gasifier gas outlet main 119 at 1100° C. where they are tempered with a side stream from the cooling gas scrubber 109 and cooling gas blower 140 via line 103 to 850° C. before passing to the hot cyclone 115 and the reduction furnace 126. The gasifier gas cooling is essential to avoid fusion and maintain discrete free flowing particles in the column of the reduction shaft furnace 126. Overheating will cause clusters or clinkers to form inside the shaft furnace with disruption of the furnace solids and gas flow.

After being cooled in the cooling gas scrubber 109 and cleaned of dust in the hot cyclone 115, the gasifier gas is passed upward in the reduction furnace 126 through the descending bed of iron ore converting it to metallic sponge iron and carburizing the reduced iron to a level of three to six percent prior to hot discharge to the melter gasifier 100. The gasifier gases are partially consumed by the reaction in the reduction furnace and discharged at 127 as furnace top gas at 140° C. The top gases are cleaned in the top gas wet scrubber 129, removing water vapor formed during iron ore reduction and discharged as export gas 131 at 40° C. The export gas is low in particulates and sulfur and has a heating value of 220 Btu/scf while containing 25% of $CO_2$.

Particulate rubber tires provide a low ash fuel or energy resource for ironmaking and direct reduction which eliminates or minimizes slag formation in the production of steel or liquid iron. In ironmaking with coal or coke made from coal, the fuel has a content of 10% or more of ash inerts (basically shale or clay) which must be fluxed with limestone and disposed of as slag to remove from the system. Nominally this slag amounts to 500 pounds for each ton of liquid iron produced. Minimization of slag formation is an obvious economic advantage. Assuming an iron ore feed to the COREX® reduction furnace with little or no silica gangue, there is a potential for a slag free liquid iron operation of the COREX® using the ash free rubber tires as fuel.

In addition, the low ash and high carbon content of rubber tires is advantageous for existing solid fuel direct reduction systems such as mentioned above since lower gangue direct reduced iron is produced for steelmaking, plus the rubber tire material improves the solid fuel reduction system thermal efficiency because of low volatiles content. Hydrocarbons in the solid fuel for direction reduction are basically lost as volatiles before the iron ore reaches reduction temperatures. Solid fuel iron ore reduction depends on the fixed carbon content of the solid fuel used as a reductant and rubber tires have a content of 90% carbon. Fixed carbon in a steam coal is nominally 60%.

High grade lump iron ore or pellets for solid fuel direct reduction normally contain 3 to 5% of silica. The silica is residual gangue which is not removed in the iron ore concentration process. As a result, when coal is used as the carbonaceous fuel as taught heretofore for direct reduction of iron, the silica derived from the iron ore alone will result in the formation of 300 to 500 pounds of steelmaking slag per ton of steel which is an extra heat load. The ash from a 40 to 50% coal reductant addition contributes another 250 pounds for 550 to 750 pounds of slag per ton of steel. This amount of slag is excessive since as little as 50 to 75 pounds of slag per ton of steel are normally needed for refining purposes.

Excessive slag formation and melting with low quality direct reduced iron requires increased power consumption in electric furnace steelmaking compared with furnace operation with slag free iron and steel scrap. For this reason steelmaking furnaces are seldom burdened with a 100% direct reduced iron charge. Thus, direct reduced iron production with a low ash low volatile solid fuel such as sheared rubber tire promotes a major reduction in process slag and is a significant steel making advantage.

A fuel with a higher flame temperature when combusted with oxygen compared to other solid fuels enables a reduction in the amount of fuel consumption and improved furnace productivity per unit weight of fuel. The heating value of rubber tires is 12,000 to 16,000 Btu/lb compared to 12,000 to 13,000 Btu/lb for coal and coke made from coal. Petroleum coke has about 15,000 Btu/lb heating value. This results in an adiabatic flame temperature 600° C. to 900° C. higher than with coal or coke made from coal which contain significant quantities of inert ash diluent when burned under the same conditions with oxygen. Rubber tires are an ideal fuel for COREX® ironmaking as it is high in carbon and has low ash content. The tires provides a high adiabatic flame temperature which is advantageous for maintaining the melter-gasifier dome temperatures for cracking tar and hydrocarbons.

Furthermore, the use of rubber tires in the COREX® process provides the manufacture of a superior reducing gas for direct reduction having a high proportion of contained carbon monoxide reducing gas. Direct reduction of iron ore was heretofore conducted using natural gas fuel as the source of reductant. In general there are two natural gas based processes for direct reduction—one of which reforms the natural gas with steam (HyL) and the other which reforms the natural gas with $CO_2$ (Midrex). Steam reforming produces a reducing gas that is predominantly hydrogen, 75%, and 25% CO. $CO_2$ reforming with the Midrex system produces a reducing gas which is 50% $H_2$ and 50% CO. Midrex direct reduction units, operated with the $CO_2$ gas reforming system, experience significantly lower clustering and particle fusion in the reducing furnace as a consequence of the higher level of CO in the reducing gas.

All of the natural gas based direct reduction furnaces experience clustering to some degree and as such are equipped with one or more levels of cluster breakers in the furnace bottom to maintain solids flow. These furnaces also must operate at lower process gas temperatures (750° C.) to avoid clustering or fusion. Furnace productivity and reduced product stability (quality) are reduced by the lower allowable processing gas temperatures.

COREX® operated with coal produces an increased level of CO content in the reducing gases compared to the gas based direct reduction furnaces. The nominal ultimate analysis of steam coal is 85% carbon and 15% hydrogen compared to natural gas containing 75% carbon and 25% hydrogen. Reducing gases produced from coal nominally have a 60% CO content compared to 25% to 50% for natural gas based reduction furnaces.

When the COREX® process is operated with rubber tires, the carbon content of the fuel is approximately 97% carbon and 3% hydrogen (10% hydrocarbons). As a result, a superior CO level of 85% is reached in reducing gases prepared from rubber tires.

The COREX® reduction furnace, using high CO reducing gases from coal, has no cluster breakers and produces a fully reduced high stability product from laminated lump ores and sinter compared to the natural gas based reduction furnaces (HyL and Midrex) which have limited tolerance for these marginal feed materials. Clustering is not experienced in the COREX® reduction furnace. In addition, the COREX® reduction furnace is operated at a process gas temperature of 850° C., a 100° C. higher processing temperature than the normal natural gas based reduction furnaces.

The high CO reducing gases from the rubber tires allow higher process gas temperatures during reduction which contribute to increased productivity and improved reduced iron quality and stability.

Shredded rubber tires provide an improved high carbon monoxide level reducing gas which prevents sintering and clustering of the reduced metallic iron. High CO level reducing gases have a two-fold advantage which minimizes clustering, (1) the low $H_2$ gas content minimizes the occurrence of catastrophic metallic iron recrystallization promoting cluster formation during reduction and (2) the CO reducing gas has a tendency to form a carbon layer by inversion at the surface of the reduced metallic iron particles acting as a lubricant and preventing sintering of the iron particles.

The use of rubber tires as fuel provides a reduced iron product with increased level of carburization which is highly advantageous as an energy source for subsequent iron and steelmaking processes. The high CO reducing gases from combustion of rubber tires increase the level of carburization of the metallic iron in the reduction furnace. Reduced iron pellets form the COREX® reduction furnace have a carbon content of 3.5% as $Fe_3C$, and the porous reduced laminated iron ore and sinter from the COREX® reduction furnace have a carbon content of 1.5% as $Fe_3C$ plus 3.0 to 3.5% of carbon contained in the pores for a product carbon content ranging from 3.5 to 5.0%.

The high level of contained carbon in the reduced iron from the COREX® reduction furnace is extremely advantageous for downstream iron and steelmaking processes as the carburized iron forms its own energy source. The use of rubber tires in the COREX® process with the resultant high carbon monoxide reducing gases increases the carbon content of the direct reduced iron to 5.0 to 6.5%. The contained carbon in the direct reduced iron is an energy source which is beneficial to COREX® ironmaking and to steelmaking whether in an electric arc furnace, an oxygen converter or an energy optimizing furnace. This is especially true in the electric arc furnace as the contained carbon permits formation of a favorable foamy slag practice during steelmaking. The use of shredded rubber as a fuel in the COREX® process is also advantageous in that recycle and use of $CO_2$ as a cooling gas with rubber particulate material for the high temperature control of the melter gasifier dome temperatures is made possible. With high heating value coals and oxygen combustion as was done heretofore, allowable melter gasifier dome temperatures are exceeded. Low pressure six bar steam is commonly injected through the tuyeres to control the melter gasifier temperatures and maintain a dome temperature of 1100° C. or less. Steam, however, increases the hydrogen level of the gasifier reducing gases.

When using high adiabatic flame temperature rubber tires and oxygen in accordance with the present invention, flame temperatures are 900° C. higher than with coal as used before the present invention and a cooling gas must be supplied for temperature control. In accordance with the present invention, dome temperatures are controlled by injecting six bar $CO_2$ at the tuyeres. With 20% injection of $CO_2$ at the tuyeres, the dome temperature is maintained at 1100° C. The $CO_2$ serves as a melter gasifier coolant and an oxidizer for the petroleum coke forming additional CO and maintaining a dome temperature of 1100° C. and a level of 85% CO in the gasifier gases. The $CO_2$ reduces COREX® process oxygen consumption by about 8%, improving process economics. The $CO_2$ is an advantageous cooling gas for controlling the dome temperature of the melter gasifier and minimizing release of $CO_2$ to the atmosphere when using petroleum coke as a fuel.

This present invention provides a method for both disposing of an environmentally undesirable material comprising rubber tires and any sulfur and metals contained therein and of providing fuel for a process of making molten iron or steel preproducts and reduction gas in a melter gasifier. The invention contemplates access to a melter gasifier having an upper fuel charging end, a reduction gas discharging end, a lower molten metal and slag collection end. Entry means are formed in the melter gasifier for charging particulate ferrous material into it. Particulated rubber tires are introduced into the melter gasifier at the upper fuel charging end. Oxygen-containing gas is blown into the rubber tire material to form at least a first fluidized bed of particles. Particulate ferrous material is introduced into the melter gasifier through the entry means and the rubber tire material, oxygen and particulate ferrous material are reacted at elevated temperature to combust the major portion of the rubber to produce reduction gas and molten iron or steel preproducts containing metals freed from combustion of the rubber tires and a slag containing sulfur freed from combustion of petroleum coke. Thus in a broad sense, the present invention involves a method of making molten iron which includes the use of a melter gasifier as a reaction vessel for converting particulate ferrous material to molten iron in a reaction with oxygen and a particulate rubber tires as fuel in the melter gasifier.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. An improvement to a molten iron making process which substantially reduces slag formation and increases the contained carbon level in the iron comprising the steps of introducing shredded rubber tires into a melter gasifier; blowing oxygen containing gas into said melter gasifier and combusting the shredded rubber tire particles to form at least a first fluidized bed of coke particles from said rubber tire particles; introducing ferrous material into said melter gasifier through an entry port in the upper portion thereof; reacting rubber tire particles, oxygen and ferrous material in said melter gasifier to combust the major portion of said rubber tire particles to produce reduction gas and molten iron containing heavy metals freed from combustion of the rubber tire particles and a reduced slag containing sulfur freed from combustion of the rubber tire particles; injecting $CO_2$ into said melter gasifier and mixing $CO_2$ with said reduction gas to form a combined reduction gas having a CO level of about 85% of the gas; flowing said combined reduction gas out of said melter gasifier; combining said combined reduction gas with a side stream of cool reducing gas to form a cooled reduction gas; directing said cooled reduction gas to a reduction furnace which is operably connected to said melter gasifier and mixing said cooled reduction gas with ferrous material in said reduction furnace to convert the ferrous material to direct reduced iron and to increase the carbon content of the direct reduced iron to above 5%.

2. The method of claim 1 further characterized in that the particles are no more than 2″ in size.

* * * * *